US008577935B2

United States Patent
Keaveny et al.

(10) Patent No.: US 8,577,935 B2
(45) Date of Patent: Nov. 5, 2013

(54) SYSTEM AND METHOD FOR STORING PERFORMANCE DATA IN A TRANSIT ORGANIZATION

(75) Inventors: Ian Terence Keaveny, Burlington (CA); Matthew Dodds, Toronto (CA)

(73) Assignee: Trapeze Software Inc., Mississauga (CA)

( * ) Notice: Subject to any disclaimer, the term of this patent is extended or adjusted under 35 U.S.C. 154(b) by 117 days.

(21) Appl. No.: 12/975,694

(22) Filed: Dec. 22, 2010

(65) Prior Publication Data

US 2011/0161380 A1    Jun. 30, 2011

Related U.S. Application Data

(60) Provisional application No. 61/291,402, filed on Dec. 31, 2009.

(51) Int. Cl.
*G06F 7/00* (2006.01)
*G06F 17/30* (2006.01)
*G06F 19/00* (2011.01)

(52) U.S. Cl.
USPC .......................... 707/812; 701/29.6; 701/32.3

(58) Field of Classification Search
None
See application file for complete search history.

(56) References Cited

U.S. PATENT DOCUMENTS

| | | | |
|---|---|---|---|
| 4,439,824 A | | 3/1984 | Mayer |
| 5,799,263 A | * | 8/1998 | Culbertson .................. 701/117 |
| 6,275,231 B1 | | 8/2001 | Obradovich |
| 2001/0018628 A1 | * | 8/2001 | Jenkins et al. .................. 701/35 |
| 2005/0131597 A1 | | 6/2005 | Raz et al. |
| 2006/0078853 A1 | | 4/2006 | Lanktree |
| 2007/0287133 A1 | | 12/2007 | Schubert et al. |
| 2009/0051510 A1 | | 2/2009 | Follmer et al. |
| 2009/0088924 A1 | * | 4/2009 | Coffee et al. .................. 701/33 |
| 2010/0131642 A1 | | 5/2010 | Chalikouras et al. |
| 2010/0209887 A1 | | 8/2010 | Chin et al. |
| 2011/0238457 A1 | * | 9/2011 | Mason et al. ................. 705/7.14 |

OTHER PUBLICATIONS

Tiong An Chua "The Planning of Urban Bus Routes and Frequencies: a Survey", 1984 Elsevier Science Publishers B.V. , 26 pages.*

* cited by examiner

*Primary Examiner* — Uyen Le
(74) *Attorney, Agent, or Firm* — McMillan LLP

(57) ABSTRACT

The present invention relates to systems and methods for storing performance data in a transit organization. Sets of performance data for runs over a plurality of routes are stored. The routes are divided into links. Associations between the sets of performance data and the links are also stored.

22 Claims, 8 Drawing Sheets

| Pattern | Links |
|---|---|
| Pattern 1 | 1-2, 2-3, 3-4, 4-5, 5-6 |
| Pattern 2 | 7-8, 8-11, 11-12, 12-13 |
| Pattern 3 | 10-9, 9-8, 8-3, 3-4, 4-5, 5-6 |
| Pattern 4 | 10-9, 9-8, 8-11, 11-12, 12-5, 5-6 |

SYSTEM AND METHOD FOR STORING PERFORMANCE DATA IN A TRANSIT ORGANIZATION

This application claims priority from U.S. Provisional Patent Application Ser. No. 61/291,402 filed on Dec. 31, 2009, the contents of which are incorporated herein by reference.

FIELD OF THE INVENTION

The present invention relates to the field of vehicle system monitoring. In particular, it relates to a system and method for storing performance data in a transit organization.

BACKGROUND OF THE INVENTION

Transit organizations have been challenged to serve ever-increasing population centers on restricted budgets. Over the past several years, the cost of fuel has risen almost 50%. As a consequence, fuel now represents a substantial portion of the annual operating budget for transit organizations.

Fuel reductions of only a few percent can, in larger transit organizations, result in savings of millions of dollars. In a recent article, the U.S. Environmental Protection Agency asserted that:

> Fleet managers have estimated that driver training and incentive programs typically results in 15% fuel savings. Two trucking fleets in Canada documented the impact of driver training and found fuel efficiency improvements of 18% and 20%, while a Canadian study estimates that many fleets could achieve a 10% fuel economy improvement through driver training and monitoring. A study of the European Commission estimates that an annual one-day driver-training course will improve truck fuel efficiency by 5%.

Fuel economy is just one of a number of metrics that can be measured to provide an indication of driver and/or vehicle performance. Other metrics can include, for example, the "jerkiness" of the ride, hard acceleration and braking, and speeding.

It can be desirable to identify, on an ongoing basis, specific drivers who may most benefit from targeted driver training in order to keep training costs low and reduce interruption of the daily operation of the transit organization. The process of identifying drivers that would best benefit from driver training, however, can prove very difficult. Direct attribution of the poor fuel economy of a vehicle to the driver operating the vehicle can result in a number of drivers being incorrectly flagged as being good candidates for driver training. There are, in fact, a number of parameters that impact the fuel economy of transit vehicles, such as the type of vehicle, the route traveled, the fare and traffic load along the route (which is largely dependant on the day and time), the weather conditions, etc. It can be inappropriate to ignore these parameters when examining the fuel economy of a vehicle being operated by a particular driver. Other methods of evaluating drivers for driver training are available, such as having a skilled assessor ride in a vehicle being operated by a driver. Should the driver be aware of the presence of an assessor, however, he may alter his driving style temporarily, thus possibly incorrectly rejecting the driver as a good candidate for driver training.

Similarly, it can also be desirable to identify vehicles that are performing poorly. As local maintenance is costly, it can be desirable to prioritize vehicles in terms of their condition and, thus, candidacy for servicing. Any metrics collected over one or more runs along routes during operation of the vehicle can be influenced, however, by the parameters identified above. For the most part, vehicle condition is reported by drivers when a vehicle exhibiting clear signs of requiring service, such as an engine running very roughly, visible smoke from the exhaust, or a significantly underinflated tire. Otherwise, the condition of the vehicle is generally assessed very infrequently when undergoing a regular scheduled maintenance. As a result, vehicles exhibiting less prominent symptoms may not be quickly identified for servicing.

There are a number of issues associated with carrying out performance analysis on full runs across a route in a single direction. As a vehicle and/or driver's performance is only analyzed after the completion of the full run, their performance during the run cannot be determined. In some cases, it can be desirable to analyze the performance of the vehicle and/or driver more frequently in order to spot issues more quickly. Further, some routes share large common portions, yet it can be inappropriate to compare the performance of a vehicle and/or driver over one route to that of another vehicle and/or driver over a similar route.

It is therefore an object of this invention to provide a system and method for storing performance data in a transit organization.

SUMMARY OF THE INVENTION

In accordance with an aspect of the invention, there is provided a method for storing performance data in a transit organization using a computer system, comprising:

storing a plurality of sets of performance data for runs over a plurality of routes, said routes being divided into links; and associating each of said sets of performance data with a particular one of said links.

During the storing, global positioning system ("GPS") coordinates associated with each of the sets of performance data can be stored, and each of the sets of performance data can be associated with the particular one of said links using the GPS coordinates. The GPS coordinates can correspond to a position of a vehicle at one of a start and an end of a time interval during which the set of performance data was collected. The link to which the set of performance data corresponds can be determined based on the relation between the GPS coordinates for the set of performance data and GPS coordinates for nodes that define the links.

The storing can include storing distance information for each of the sets of performance data, and the associating can include attributing the sets of performance data to the links at least partially based on the distance information.

The sets of performance data can identify a vehicle type from which the performance data was collected.

In accordance with another aspect of the invention, there is provided a method for storing performance data in a transit organization using a computer system, comprising:

storing sets of performance data for runs over a plurality of routes, said routes being divided into links; and storing associations between said sets of performance data and said links.

The storing can include storing global positioning system ("GPS") coordinates associated with each of the sets of performance data, and the associations can be determined using the GPS coordinates. The GPS coordinates can correspond to a position of a vehicle at one of a start and an end of a time interval during which the set of performance data was collected. The determining can include determining which of the links the set of performance data corresponds to based on the relation between the GPS coordinates for the set of performance data and GPS coordinates for nodes that define the links.

The storing can include storing distance information for each of the sets of performance data, and, before the storing associations, the associations between the sets of performance data and the links can be determined at least partially based on the distance information.

The sets of performance data can identify a vehicle type from which the performance data was collected.

In accordance with a further aspect of the invention, there is provided a method for storing performance data in a transit organization using a computer system, comprising:

registering performance data for a plurality of runs over a plurality of routes divided into links; and storing said performance data and associations between said performance data and said links.

In accordance with a still further aspect of the invention, there is provided a method for storing performance data in a transit organization using a computer system, comprising:

storing a plurality of sets of performance data for runs over routes divided into links, said sets of performance data including an identifier identifying said links over which said sets of performance data were collected.

The sets of performance data can be associated with the links

In still yet another aspect of the invention, there is provided a system for storing performance data in a transit organization, comprising:

a database storing a plurality of sets of performance data for runs over a plurality of routes, said routes being divided into links, and storing associations between said sets of performance data and said links.

The sets of performance data can include a vehicle type. An association module can determine the associations between the sets of performance data and the links. The sets of performance data can include GPS coordinates, and the association module can determine the associations using the GPS coordinates. The association module can compare the GPS coordinates for the sets of performance data to GPS coordinates for nodes that define the links to determine the associations.

In accordance with a further aspect of the invention, there is provided a system for storing performance data in a transit organization, comprising:

a database storing a plurality of sets of performance data for runs over routes divided into links, said sets of performance data including an identifier identifying said links over which said sets of performance data were collected.

Other and further advantages and features of the invention will be apparent to those skilled in the art from the following detailed description thereof, taken in conjunction with the accompanying drawings.

BRIEF DESCRIPTION OF THE DRAWINGS

The invention will now be described in more detail, by way of example only, with reference to the accompanying drawings, in which like numbers refer to like elements, wherein.

DETAILED DESCRIPTION OF THE EMBODIMENTS

Figure 1:
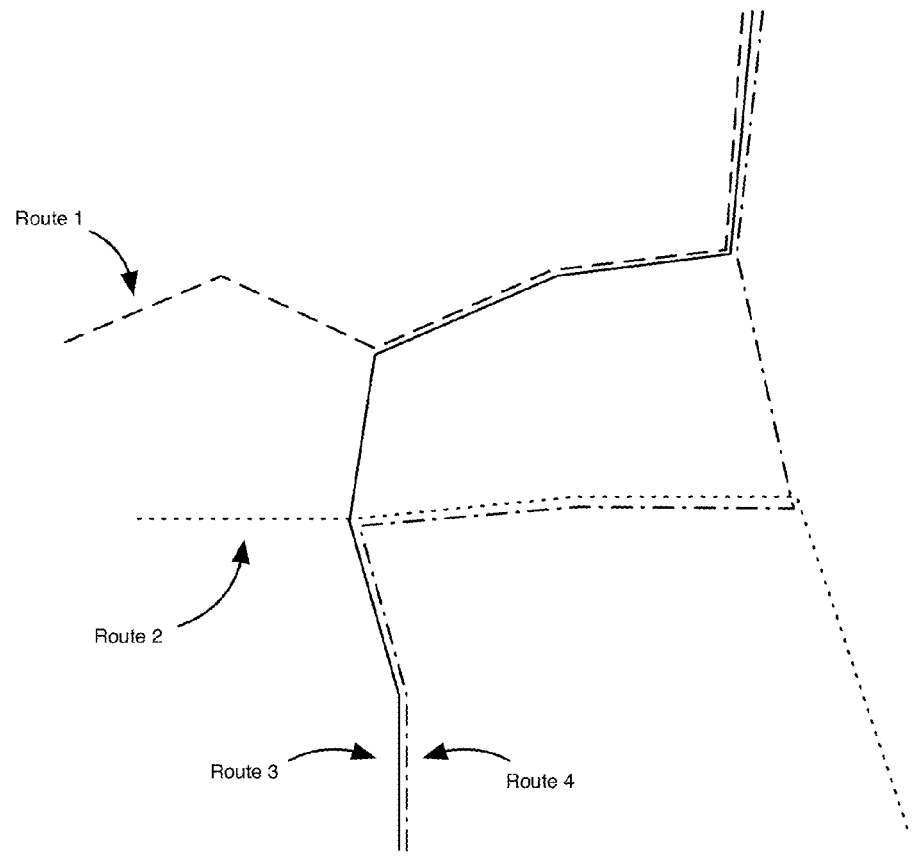
FIG. 1 shows an exemplary set of routes having some common portions.

It can be desirable for transit organizations to collect performance data for its vehicle fleet, and then analyze the performance data to more clearly understand it. If transit organizations could more readily recognize trends in the performance data and attribute the trends to specific factors, they could identify drivers that are good candidates for driver training or recognition awards, and vehicles that would benefit most from servicing.

In order to facilitate the analysis of performance data, transit routes are divided into links in the invention. The division of routes into links enables the assessment of a driver and/or vehicle's performance mid-route. In fact, analysis can be performed for each link, thereby facilitating early identification of any issues in the performance of the driver and/or vehicle. This enables the early identification of underperforming vehicles. In the case where the performance of a driver is being analyzed, comparison of the relative performance over the links can assist in identifying links over which the driver did not perform as well, relatively or absolutely.

Additionally, by dividing routes into links, some comparison can be performed for runs over two different routes having common portions. In some cases, different transit routes are variants of one another, and share a common portion, typically along a major street. By dividing these routes into links such that the common portion forms part of one or more common links defined for the routes, the performance of vehicles and/or drivers on a first route can be compared to the performance of vehicles and/or drivers on a second route over the common link(s).

Performance is measured by metrics. There are a variety of metrics that can be of interest to transit organizations. One important metric is fuel economy. It is generally desirable to reduce the overall fuel expenditure of a transit organization. Another set of metrics relate to the "jerkiness" of a ride. Other metrics relate to, for example, the measured position of the acceleration pedal and the brake pedal. Intelligent comparison of these metrics permits analysis and evaluation of drivers and/or vehicles.

Factors

There are a number of factors that can affect the performance of transit vehicles and the services provided by a transit organization. Factors can be thought of as inputs that have a direct impact on the performance and quality of service over one or more links. The two factors that will be discussed are the driver and the vehicle.

The driving skills and habits of a driver can have a significant impact on the fuel economy of a vehicle. Similarly, good driving skills and habits also generally equate to a satisfactory experience for commuters riding on a vehicle. A number of principles that characterize good driving skills and habits are listed below.

Slow, smooth acceleration from a stop: Slow, smooth acceleration from a stop position consumes considerably less fuel than quick, heavy-footed acceleration. A vehicle's engine is kept operating at a more efficient revolutions-per-minute ("RPM") range during slow acceleration than when accelerating quickly, thereby also reducing the stress and wear placed on the engine. Additionally, smooth, gentle acceleration from a stop provides, not surprisingly, a less jerky riding experience for commuters.

Slow, smooth braking: Slow, smooth braking when approaching an expected stop causes significantly less wear on the brake components of a vehicle in comparison to abrupt application of the brakes. Additionally, slow, smooth braking provides a less jerky riding experience for commuters.

Modest idling: When a vehicle is expected to remain stationary for a number of minutes, the savings on fuel consumption achieved by turning off the engine exceeds the cost of additional wear on the engine by restarting it.

Moderate speed: A vehicle is less stressed and consumes less fuel when driven at moderate speeds in comparison to higher speeds. By maintaining the RPMs of the engine in a lower, more-efficient range, fuel can be saved. Additionally, irregularities in the road surface challenge the suspension of vehicles when they are driven at lower speeds, thus providing a smoother ride for commuters. Further, moderate speeds are associated with lower incident rates and with reduced severity of accidents, and are thus associated with lower liabilities.

Minimal anticipation: Anticipation refers to the practice of releasing the brake pedal early during a red light in anticipation of a green light. As is often the case, a green light may occur more slowly than expected, resulting in a need to reapply the brake. The result is unnecessary jerking of commuters and additional wear on the brake components.

Similarly, the condition of a vehicle can vary significantly, thus impacting the fuel economy and other metrics of the vehicle. There are many ways in which the condition of a vehicle can be poor. For example, a filter can be underperforming, either due to being dirty or otherwise malfunctioning. One or more spark plugs may not be firing correctly. The fuel injection system or carburetor may be providing a suboptimal mix of fuel and air. The tire pressure may not be optimal. Any of these can result in poor fuel economy.

Analysis of the relationships between the factors and the performance data enables identification of the variations of the factors that correspond to good or poor performance. For example, when a first driver operates a particular vehicle, he may operate its in a more fuel-efficient manner than a second driver, suggesting that the first driver has driving skills and habits that lead to better fuel efficiency than those of the second driver. Similarly, when a driver operates a first vehicle, the fuel economy can be better than when operates a second vehicle. All other things being equal, this suggests that the first vehicle is in better condition than the second vehicle, at least from a fuel economy point-of-view.

In order to be able to properly compare performance data collected by a transit organization, it can be desirable to compare variations in factors between runs across links that were completed under similar circumstances. The portion of a run across a link shall hereinafter be referred to as a "link-run".

Parameters

Parameters are used to characterize the performance data collected during the link-runs and include, but are not limited to, the vehicle type, the link and direction traveled, and the general time of day during a vehicle is operated. Other parameters affecting a vehicle's metrics exist, such as irregular events that trigger fluctuations in the volume of fares or the traffic present, driving conditions precipitated by bad weather or passenger medical emergencies. In the described embodiment, these other parameters are ignored or used to classify link-runs as being irregular.

The vehicle type can significantly affect the performance data. A transit organization can employ a number of different types of vehicles, each employing a different engine, having a different weight, geared differently, etc. As a result, these different vehicle types can have varying expected fuel economies and other metrics.

Each link can have a significant impact on the performance data. Some links can have a high density of passenger and/or traffic stops, thus requiring the vehicle to start and stop more frequently per kilometer. Some links can be hillier than other links, causing more fuel to be consumed per kilometer than over flatter links.

The day-time block generally identifies the general time of day during which a vehicle is operated. Each day is categorized as either a weekday or a weekend day. Further, a number of day-time blocks are defined for weekdays and for weekend days based on volume of traffic, fares, etc. In particular, weekdays are divided into a first day-time block from midnight to 6:30 AM, a second day-time block from 6:30 AM to 9:30 AM denoting the morning rush hour, a third day-time block from 9:30 AM to 3:00 PM, a fourth day-time block from 3:00 PM to 7:00 PM denoting the afternoon rush hour, and a fifth day-time block from 7:00 PM to midnight. Weekend days are divided into day-time blocks in a similar manner. During day-time blocks that encompass rush hours, vehicular traffic over most links is generally heavier than at other times, and the number of fares is larger. Both the greater volumes of vehicles and commuters translate into more stops for a vehicle.

Further, the direction being traveled along a link in combination with the day-time block can have a significant impact on the performance of a vehicle. The volume of commuters and vehicular traffic can be significantly greater in one direction versus the other during one day-time block, such as a morning rush-hour, and then significantly greater in the other direction during another day-time block, such as an afternoon rush-hour.

Route Segmentation into Links

In order to further describe the definition of links, an exemplary simplified transit network is shown in FIG. 1. As shown, portions of the routes are common to two or more of the routes. As these routes share common portions, it can be desirable to compare the performance of a vehicle and/or driver over the common portion of a first route to that of a vehicle and/or driver over the same common portion of a second route. Even further, where three or more routes share a common portion, it can be desirable to compare the performance of vehicles and/or drivers over the common portion, regardless of the overall route being serviced by the particular vehicles and/or drivers.

There are a number of considerations when dividing routes into links. A number of exemplary considerations are described below.

Common portions: As noted above, the inclusion of common portions of routes in one or more links that are shared between particular routes permits direct comparison of performance data collected on the shared links across the particular routes.

Length: It can be desirable to divide routes into links at least partially based on a desired length of link, based on travel length, expected time to complete, etc. Accordingly, minimum and maximum "lengths" can be established for links.

Categorization: Different portions of routes can present different challenges to vehicles and/or drivers. For example, some route portions can be relatively hilly versus other portions that are relatively flat. Some route portions can be relatively straight versus other portions that are relatively curvy. Some route portions can be relatively densely populated with stops, either traffic light or scheduled vehicle stops, whereas other portions can be relatively free of the same. It can be desirable to categorize route portions in this manner in order to enable comparisons to be drawn between like portions of different routes, or to enable more rapid identification of issues affecting the performance of a vehicle and/or driver.

Junctures: The recognition of junctures along a route or routes where changes of a driver and/or vehicle can frequently occur can serve to define natural divisions of links along routes. For example, where a vehicle depot is situated partway along a route, vehicles can be retired for refueling and substituted with a newly-refueled vehicle. Additionally, the vehicle depot can be a natural point for drivers to be relieved to take breaks. In such cases, dividing a route at the junctures can be desirable since it is desirable to maintain common factors (i.e., drivers and/or vehicles) across an entire link.

In the present embodiment, portions of routes that are common between the routes are identified for division into one or more common links, then common and non-common portions of routes are divided into links using a minimum and maximum estimated time to completion (i.e., a desired length).

Figure 2:
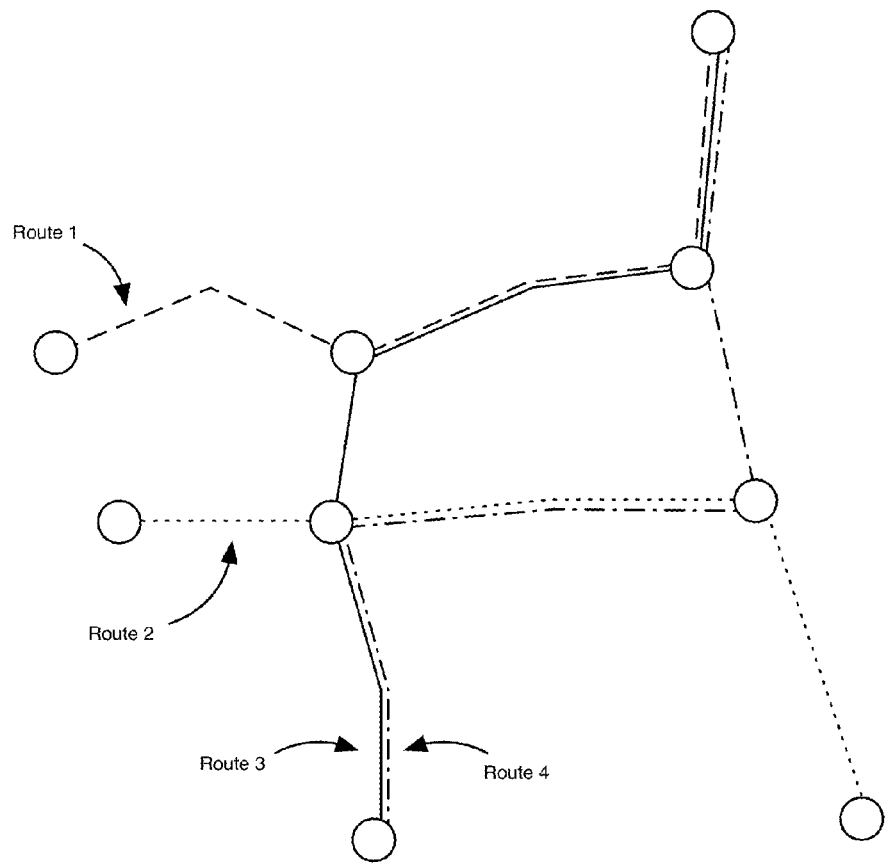
FIG. 2 shows an initial set of nodes that are established for the routes of FIG. 1.

FIG. 2 shows the initial identification of nodes (i.e., points) that may serve as good dividers of the routes of FIG. 1. As shown, a node is placed at each end of each route and at the start and end points of common portions of multiple routes.

Figures 3, 4:
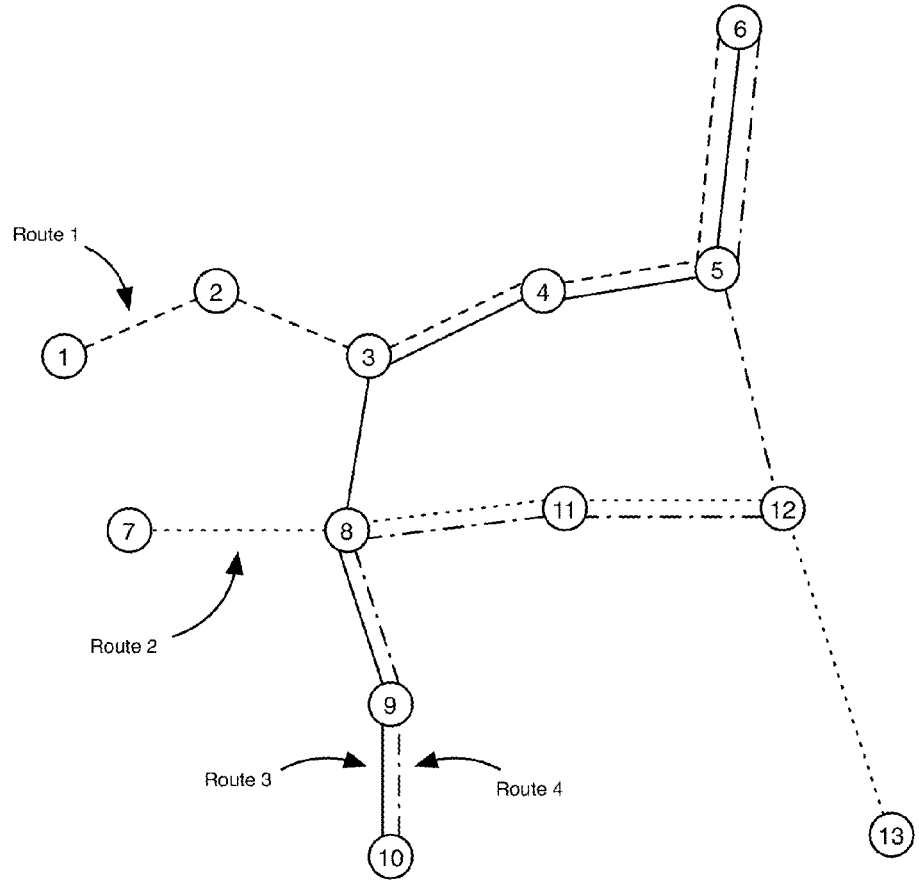
FIG. 3 shows the final segmentation of the routes of FIG. 1 into links.
FIG. 4 is a table of the links traversed for each route of FIG. 1.

FIG. 3 shows the further division of the portions of the routes between nodes based on the desired length. As shown, the portion of Route 1 between node 1 and node 3 was divided into two links as it exceeded the maximum desired length for a link. The portion of Route 2 between nodes 7 and 8 was deemed to be between the minimum and maximum desired length for a link and was thus left as is.

FIG. 4 shows a table that lists the links that form each of the four routes after division.

In some cases, there may be two or more route paths between two nodes defining two or more separate links. In such cases, two separate links can be defined and named to distinguish between the paths.

Exceptions can be defined for link selection methods wherein, for example, a route has a portion that is not shared with other routes adjacent a portion shared with another route, wherein the unshared portion is smaller than the minimum desired length. In order to preserve the ability to divide the shared portion of the route into common links, the short unshared portion can be accepted as an irregular link.

System and Operating Environment

Figure 5:
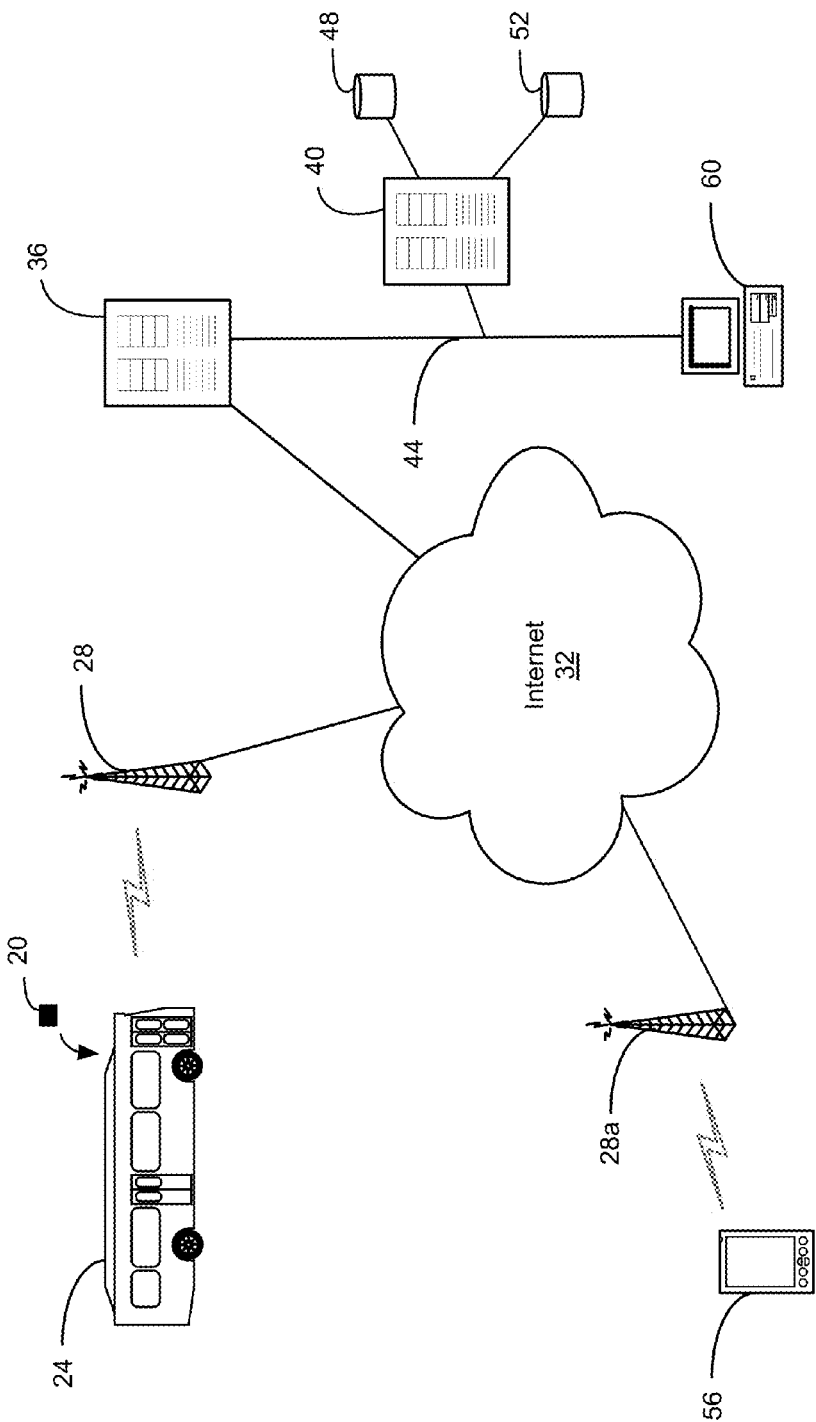
FIG. 5 is a schematic diagram of a system for storing and analyzing performance data in a transit organization in accordance with an embodiment of the invention, and its operating environment.

FIG. 5 shows a system for storing performance data in a transit organization in accordance with an embodiment of the invention, and its operating environment.

An on board unit ("OBU") 20, commonly referred to as a "black box", is installed in a transit vehicle 24. The OBU 20 is a device that collects performance data about the vehicle while the vehicle is in operation, temporarily stores the performance data, and then transmits the performance data at regularly scheduled intervals. The OBU 20 is secured inside the vehicle 24 so that it is not easily removable without the use of a screwdriver. The OBU 20 is shown in communication with a cellular base station 28 for transmission of the performance data. The cellular base station 28 is coupled to the Internet 32 via a number of intermediate proxies and servers that form part of the infrastructure of a cellular communications carrier (not shown).

A gateway 36 is also coupled to the Internet for receiving performance data from the OBU 20. The functionality of the gateway 36 is provided by an application service operating on a server of the transit organization. Upon receiving the performance data, the gateway 36 transfers the performance data to a database server 40 coupled to the gateway 36 over a local area network 44. The database server 40 stores the performance data in a performance data database 48. In addition, the database server 40 manages a scheduling database 52 that stores scheduling information for vehicles and drivers in the transit organization. Some of the scheduling data is merged by the database server 40 with the performance data stored in the performance data database 48. Namely, driver-vehicle associations specifying which driver was operating which vehicle are transferred to the performance data database 48 for merging with the other performance data. An association module executes on the database server 40 and acts to associate performance data collected via the OBUs 20 and links.

A mobile device 56 is also in communication with a cellular base station 28a that is similar to cellular base station 28 in many respects except that it may form part of the infrastructure of a separate cellular communications carrier. The cellular base station 28a is also in communication with the Internet 32 via a number of intermediate proxies and servers that form part of the infrastructure of the cellular communications carrier (not shown). The mobile device 56 permits a schedule manager to input and modify schedule changes, including driver changes, vehicle changes, and changes to runs along routes (such as "short-turning" a vehicle).

An analysis computer 60 is coupled to the database server 40 over the local area network 44 for analyzing the performance data stored in the performance data database 40. The analysis computer 60 executes a monitoring application that has an "adapter" that receives data from the gateway 36. The "adapter" is a communication service that connects a browser-based monitoring tool to the gateway 36 and refreshes the latest performance data as the gateway 36 receives updates from the OBUs 20.

The monitoring application also has analysis tools that support generic reports and dashboards. For example, fuel monitoring tools include fuel consumption, fuel efficiency and idle time reports with drill-downs by date, vehicle, driver and pattern.

Real-time and historical dashboards with a variety of visualizations (graphs, pie charts and gauges) are available to give managers a summary of the vehicle fleet's performance at a glance. Managers will also be able to set thresholds on specific performance metrics so that they may identify areas for potential improvement.

A real-time aspect of the monitoring application can be effectively used by management to oversee the operation and provide valuable feedback. For example:

real-time vehicle tracking that pinpoints each vehicle's location on a map real-time information displayed as tool tips for each vehicle on the map—speed, driver, route, vehicle, direction, fuel usage, idle time, etc.

route/driver/vehicle assignment data displayed for the selected vehicle support for a Google map with a terradata overlay ability to define a subset of engine metrics to be displayed security to control access to data by user, garage, division, provider, etc.

schedule adherence

Additionally, the monitoring application has a component that can be used to determine driver and vehicle trends over time via analysis of the performance data in the performance data database 48. Using this information, the monitoring application can directly alert the fleet maintenance department that a particular vehicle is underperforming. Similarly, the monitoring application can directly alert human resources that a driver is exceeding performance expectations or underperforming.

Data Collection from the Vehicle

Figure 6:
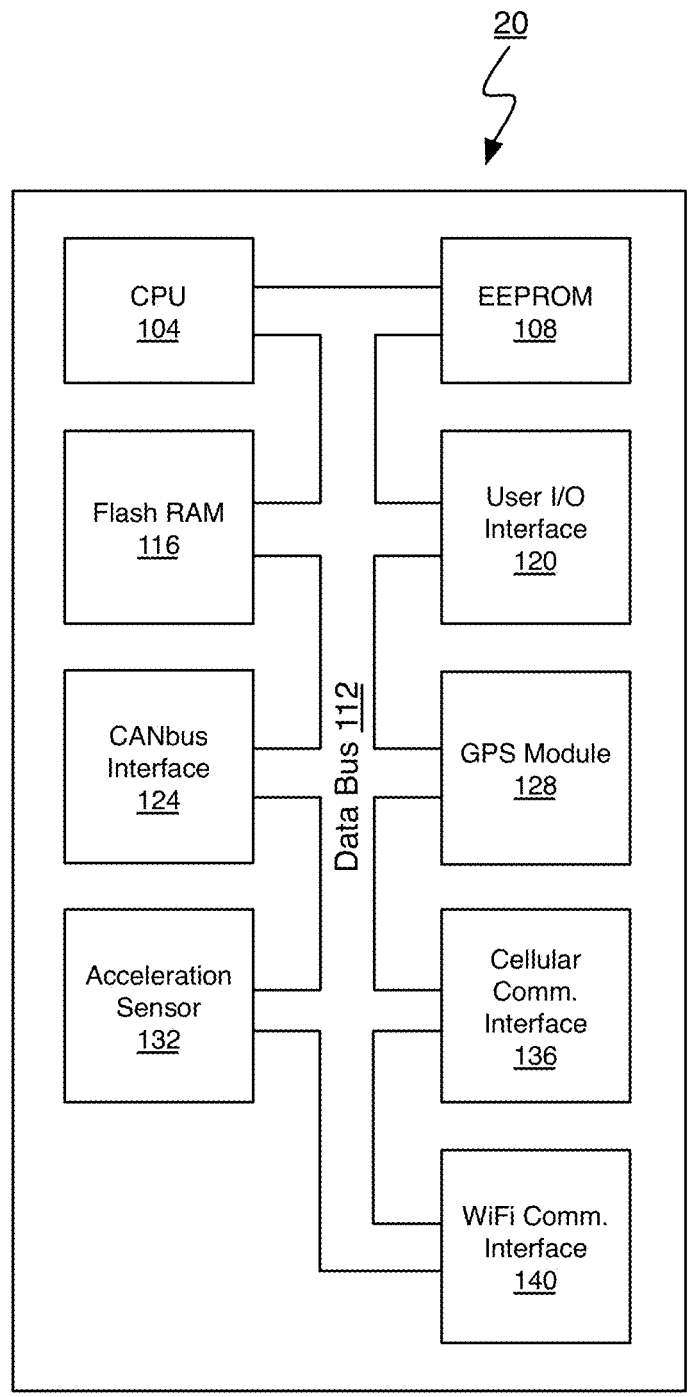
FIG. 6 is a block diagram of an on board unit installed in the vehicle shown in FIG. 5.
Figure 7:
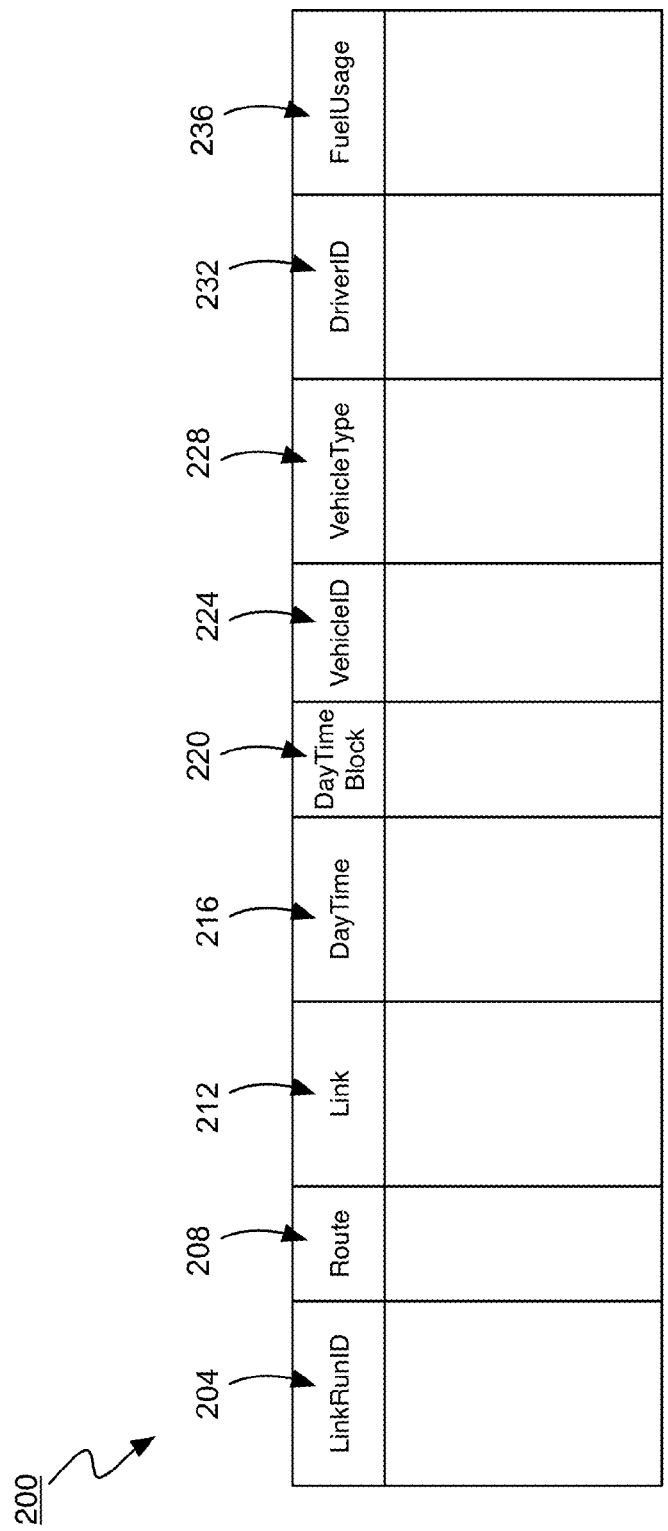
FIG. 7 is an exemplary set of performance data stored in the performance data database of FIG. 5.

FIG. 6 is a schematic diagram showing a number of components of the OBU 20. The OBU 20 includes a central processing unit 104 that manages the operation the OBU 20 via an operating system stored in an EEPROM 108 and accessed over a local data bus 112. A bank of flash RAM 116 stores settings and data collected during operation of the vehicle 20. In particular, 16 megabytes have been found to be sufficient for the application. A user input/output interface 120 permits configuration of the OBU 20. The user input/output interface 120 includes a USB port to enable the OBU 20 to be reprogrammed or reconfigured, and a reset button to reboot the OBU 20 when it is found to be functioning erratically.

A controller area network bus ("CANbus") interface 124 receives metrics from the engine and, similarly to a standard serial interface, uses a nine-pin connector. The CANbus interface reports 124 separate vehicle metrics, including, but not limited to, the engine temperature, the oil pressure, distance traveled (odometer deltas), speed, fuel usage, brake pedal position, throttle pedal position, and idle time. The particular metrics that are recorded by the OBU 20 are vehicle speed, fuel usage, braking, throttle and idling.

A global positioning system ("GPS") module 128 registers the position of the OBU 20 and, hence, the vehicle 24 in which the OBU 20 is installed. The OBU 20 can then append location information onto data collected to register its context. Additionally, the OBU 20 can transmit the location information to the gateway 36 to enable live tracking of the vehicle 24.

An acceleration sensor 132 registers and reports acceleration metrics, which are measured along three axes. The acceleration metrics supplement the other metrics collected via the engine interface 124, and more readily indicates rapid changes in the movement of the vehicle 24 generally associated with less desirable driving skills and habits and a lower quality of ride for commuters.

A cellular communications interface 136 communicates data collected by the OBU 20 to the gateway 36 via the cellular base station 28. The cellular communications interface 136 uses any one of GPRS, 1XRTT, EDGE, HSDPA, Mobitex, or another Internet Protocol-based data radio standard, to communicate with the cellular base station 28.

A WiFi communications interface 140 is also present in the OBU 20 for situations where less-frequent WiFi data uploads via short-ranged wireless communications are opted for in place of more frequent cellular communications.

Each OBU 20 has a unique identifier that is transmitted during communications either via the cellular communications interface 136 or via the WiFi communications interface 140. The unique identifier of the OBU 20 is associated with a vehicle 24 into which the OBU 20 has been installed, and this association is registered in a performance data database 48.

While the CANbus interface 124 reports these metrics each second, it may not be desirable to report all these metrics to the gateway 36 or to store all of these metrics in the flash RAM 116. Accordingly, the OBU 20 processes and aggregates some of these metrics for user-defined n-second time intervals. For example, the distance traveled, fuel usage and idling time can be aggregated over twenty-second time intervals, whereas speed, throttle pedal position and brake pedal position are averaged over the same intervals. The OBU 20 then records the set of performance data for this time interval in the flash RAM 116 and sends it to the gateway 36, along with the day/time and location information (i.e., GPS coordinates) of the OBU 20 at the end of the time interval. The frequency can be adjusted to accommodate for, amongst other factors, the cost of data communications over the cellular communications network.

Driver-Vehicle Association

The performance data collected via the OBU 20 and stored in the performance data database 48 is combined with scheduling data from the scheduling database 52 that indicates which driver was driving which vehicle at what day and time. When merged, this scheduling data becomes part of the performance data. In the absence of an existing driver identification system in vehicles, the system relies on driver-vehicle pairings from the scheduling database 52 from 'pull out' to 'pull in' of a driver with a vehicle 24.

The association of a driver with a vehicle stored in the scheduling database 52 comes from two sources of information—the planned service and the actual service. The planned service is the result of a formal scheduling process that considers the following when assigning drivers to vehicles:

the trips that need to be performed the way these trips are chained together into vehicle assignments called blocks and defined by a pull-out time/location to a pull-in time/location the division of the vehicle assignments into pieces of work assignments for drivers called "runs" and defined by an 'on bus' time/location to an 'off bus' time/location the allocation of the work assignments to drivers, taking into account any planned absences, such as vacations The planned service is planned using a bidding process that is a commonplace approach for problems where demand and supply are to be matched.

When a driver starts his work assignment, he is allocated a vehicle. The driver will stay with that vehicle until he is either relieved by another driver or the vehicle is returned back to the depot at the end of the block. This means that, based upon the work assignments, the driver can operate more than one vehicle and a vehicle can be operated by more than one driver over a block.

What actually happens on the day of service, however, may be very different from the planned service. Drivers may call in sick or not turn up and will need to be substituted, vehicles may break down and need to be replaced, and so on. In order to ensure that an accurate picture of the day is recorded, all the exceptions to the planned service must be noted.

Referring again to FIG. 5, changes to the planned service can be made via the mobile device 56. The mobile device 56 presents the planned service and permits a user (namely a transit service manager) to select runs including the associated driver-vehicle pairing and change any of the information. The same changes can be made via a dashboard displayed on the analysis computer 60.

Merging, Associating and Filtering of the Performance Data

During regular operation, the database server 40 merges the performance data from the performance data database 48 with the adjusted planned service data from the scheduling database 52 for the runs along the plurality of routes. In particular, during the merging, records for runs in the performance data are matched up with the adjusted planned service by determining when a vehicle was being operated by a particular driver, based on the pull-out and pull-in data, and associating runs for that vehicle over that period of time with that driver. Some checks are subsequently performed to evaluate the integrity of the data to ensure that the merged data is valid (e.g., that a driver was not registered as driving two vehicles simultaneously or that a vehicle was not performing two runs simultaneously).

In addition, the association module executing on the database server 40 associates the sets of performance data collected by the OBUs over the 20-second time intervals and stored in the performance data database 48 with links. Each set of performance data includes the GPS coordinates of the OBU (and, thus, the vehicle) at the end of the time interval covered by the set. The association module of the database server 40 compares the GPS coordinates for the current and preceding set of performance data to the GPS coordinates for the nodes that define the links on the route being traveled by the particular vehicle to determine which link it should associate the set of performance data with. Where a set of performance data spans more than one link, the performance data is attributed to the two links on a pro-rata basis based on the distance over each link represented by the set of performance data as determined using the GPS coordinates. In addition, the association module is cognizant of adjacent sets of performance data and uses them to verify the link with which the set of performance data is associated.

The performance data is filtered to remove data for link-runs having any changes in the vehicle or driver performing the run along the link. When the data for a link-run includes a change in the vehicle or driver, the performance data cannot be attributed to a single driver and vehicle combination, which is the goal. Further, when a link is not complete or is completed in an irregular manner, it can be inappropriate to compare the performance data for that partial link to performance data for other full link-runs. There are a variety of reasons why a link may not be completed regularly, examples of which are described below.

Vehicle short-turn: It can be decided to short-turn a vehicle for a number of reasons. For example, it can be advantageous to redirect a vehicle in the opposite direction along the same route where the perceived fare volume commuting in that direction is not being served well enough.

Driver change: Drivers can be changed mid-link along a route for a number of reasons. For example, a driver may feel ill and may need to be relieved.

Vehicle change: Vehicles can also be changed mid-link. Typically, this is done where a vehicle is perceived to be underperforming, but can also occur when a vehicle has been in an accident.

Abnormal delay: Link-runs can be delayed abnormally for a variety of reasons, such as when traffic accidents block their progress or in the case of passenger emergencies. While the link-run may be completed, the extenuating circumstances may make it inappropriate to compare the performance data for such runs to other link-runs.

Generally, the division of routes into links reduces the probability that a run across a link will not be completed with a single driver operating a single vehicle for the full link without irregular circumstances.

The present system discards data for link-runs that were cut short or where the variables were changed mid-link so that data from complete link-runs can be compared to other data from complete link-runs.

FIG. 6 shows the layout of an exemplary dataset 200 stored for link-runs. The shown dataset 200 only shows one metric for ease of illustration. The sets of performance data collected and stored by the performance data database 48 are aggregated for each link to generate a single record for each link-run.

The dataset 200 includes a link-run ID field 204, a route field 208, a link field 212, a day/time field 216, a day-time block field 220, a vehicle ID field 224, a vehicle type field 228, a driver field 232, and a fuel economy field 236. Each run along a link is assigned a unique ID that is stored in the link-run ID field 204. The route and particular link being run are stored in the route field 208 and the link field 212 respectively. The day/time field 216 registers the date and time at the start of a link-run. The date and time stored in the day/time field 216 are used in combination with pre-defined parameters for each route, namely the estimated time to complete the link, in order to slot the link-run into a particular pre-defined day-time block stored in the day-time block field 220. The vehicle field 224 identifies the unique ID assigned to the vehicle that performed the link-run. The vehicle type is determined by referencing another table that stores information for each vehicle and is stored in the vehicle ID field 228. The driver field 232 identifies the unique ID assigned to the driver that operated the vehicle for the link-run. The fuel usage field 236 registers a fuel economy metric derived by dividing the fuel used during the link-run by the distance traveled during the same.

Analysis of the Performance Data

Once the data is stored in the performance data database 48, analysis can be performed to assess the performance of a vehicle and/or driver. There are two general manners in which the performance data can be analyzed: real-time and global.

Real-time analysis generally relates to the performance of a vehicle and/or driver as they are performing link-runs, and the assessment of the performance data for those link-runs that the vehicle and/or driver recently completed. Some examples of real-time analysis that can be performed for a driver include:

comparison of the performance data for a driver to the average of the performance data from their previous trips
  comparison of the performance data for a driver to the average of the performance data for all the other drivers (or specific driver(s))
  comparison of the performance data for a driver to the performance data of an 'expert' driver (note: an 'expert' driver is calculated by assigning the value of the metric for the best performer, for the same link, during the same day-time block, and on the same vehicle type)

Similarly, real-time analysis of vehicles can be performed using the performance data in the performance data database 48 in a number of ways, including:

comparison of the performance data of a vehicle to the average of the performance data for their previous trips
  comparison of the performance data of a vehicle to an average of the performance data for all the other vehicles of the same vehicle type
  comparison of the performance data of a vehicle to the performance data for an 'expert' vehicle of the same vehicle type (note: an 'expert' vehicle is calculated by assigning the value of the metric for the best performer, for the same link, during the same day-time block, and on the same vehicle type)

Figure 8:
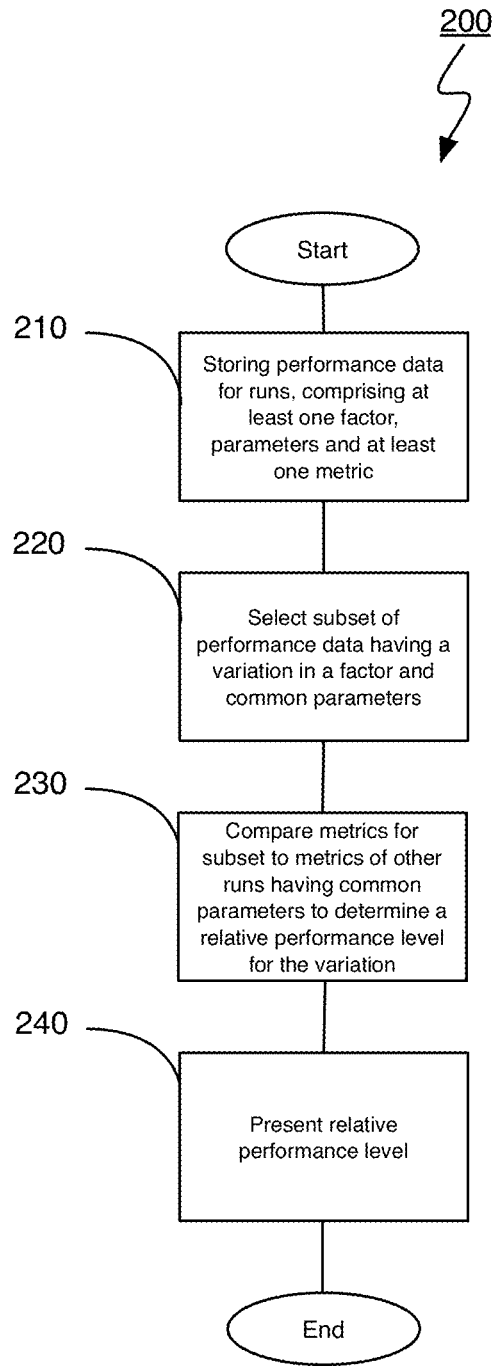
FIG. 8 is a flowchart of the general method of storing and analyzing performance data carried out by the system of FIG. 5.

Global analysis is an assessment of a vehicle's and/or driver's overall performance. In determining the overall performance of a vehicle and/or driver, the vehicle and/or driver's performance over a particular link or over all links is compared to that of other vehicles and or drivers. Alternatively, a historical global analysis can be performed, wherein the performance of the vehicle and/or driver is analyzed over a time period to spot trends. Some examples of global analysis include:

comparison of the performance data for a vehicle over all link-runs performed by that vehicle over a specific link to that of other vehicles of the same vehicle type over the same link a weighted average of the above comparison for many links, wherein the comparison for one link is weighted based on the number of link-runs that the vehicle has performed across that link historical analysis of the comparison of the performance data for a vehicle over each link-run to that performed by other vehicles of the same vehicle type over the same link to spot trends in the deterioration of the condition of a vehicle historical analysis of the comparison of the performance data for a driver over each link-run to that performed by other drivers operating the same vehicle type over the same link to spot trends in the performance of the driver FIG. 8 is a flowchart showing the general method of analyzing the performance data employed by the analysis computer 60 generally at 300. By grouping link-runs that occur over a particular link during a particular day-time block with a particular type of vehicle together, variations in these parameters can be "eliminated". In this manner, better comparisons can be made between drivers, or between a driver and his past performance. Similarly, better comparisons can be made between vehicles, or between a vehicle and its past performance.

The method begins with the storing of performance data for runs (step 210). The performance data database 48 includes, for each of the link-runs, at least one factor, parameters and at least one metric.

A subset of the performance data having common parameters and a common variation in a factor is selected (step 220). Depending on the type of comparison, the subset can include performance data for a single link-run or for multiple link-runs having the common variation.

The performance data for the subset is then compared to other performance data having common parameters to determine a relative performance level for the variation (step 230). The other performance data is selected based on the type of comparison.

The relative performance level is then presented (step 240). Once the relative performance level is determined, it is then presented by the monitoring application executing on the analysis computer 60.

As will be understood, the same kind of analysis can be performed for a particular vehicle, and/or over a portion of all combinations of route, vehicle type and day-time block.

Alternative Data Communication Configuration

Figure 9:
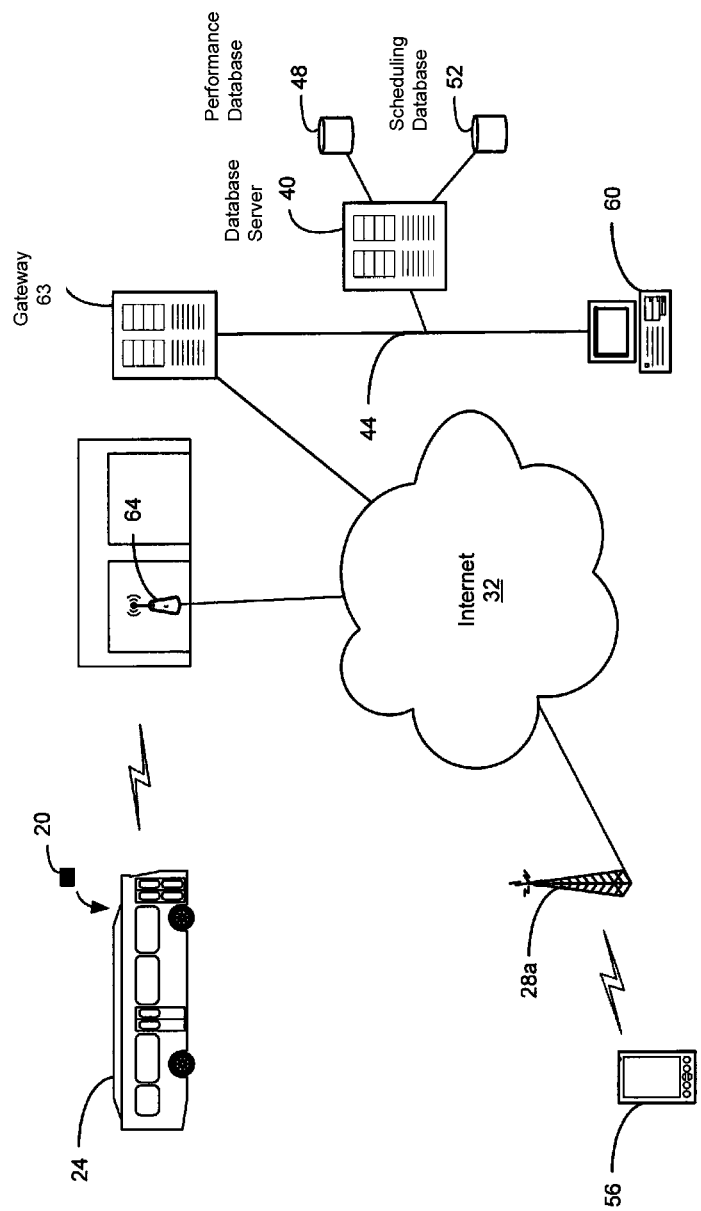
FIG. 9 is a schematic diagram of the system for analyzing performance data in accordance with another embodiment of the invention, and its operating environment.

FIG. 9 shows a second embodiment with an alternate configuration wherein the cellular communications interface 136 of the OBU 20 is disabled. In this configuration, the metrics collected by the OBU 20 are stored and then communicated when the vehicle 24 is at a vehicle depot 63. The vehicle depot 63 has one or more digital enhanced cordless telecommunications DECT units 64 that are coupled to the Internet 32 via a router (not shown). When the vehicle 24 is proximate to the DECT unit 64 the OBU 20 initializes communications the metrics collected during the runs since the last data uploading (typically once a day). This process typically takes less than ten seconds.

While association of performance data is done by the database server in the above-described embodiments, other methods will occur to those skilled in the art. For example, the OBUs can be provided with the GPS coordinates of the nodes defining links along the route being traveled and other route information to allow the OBU to determine which link it is traveling across. In this case, the sets of performance data transmitted by the OBU can include an identifier of the link across which a particular set of performance data was collected.

It can be desirable to divide sets of collected performance data between links in some cases, such as where links are relatively short compared to the time interval across which the performance data is collected. The particular set(s) of performance data can be pro-rated across the two links based on the GPS coordinates associated with the set of performance data, the distance covered, etc.

While GPS coordinates are used in the above-described embodiments to associate sets of performance data with links, other methods can be used. For example, the performance data can include the distance traveled, permitting analysis of all of the performance data collected along a route in association with known metrics (i.e. the lengths of each link) for the route.

It can be desirable in some circumstances to attribute performance data sets to a single link only, such as where, for example, the performance data sets encompass relatively short periods of time and the links are relatively long.

While the day-time blocks are described as being uniform across all routes, it may be desirable in some circumstances to define the blocks differently for each route. For example, some routes may have different busy periods, such as, for example, routes that travel to or past shopping malls. Other routes may not generally be affected by rush hours. In such cases, it can be desirable to model the day-time blocks for subsets of the routes to accommodate such variations in the volumes of passengers or traffic experienced by the subsets of routes.

This concludes the description of the presently preferred embodiments of the invention. The foregoing description has been presented for the purpose of illustration and is not intended to be exhaustive or to limit the invention to the precise form disclosed. It is intended the scope of the invention be limited not by this description but by the claims that follow.

What is claimed is:

1. A method for storing performance data in a transit organization using a computer system, comprising:

storing, on a computer readable medium, a plurality of sets of performance data for runs over a plurality of routes, said routes being divided into links, wherein said performance data permits analysis of drivers and vehicles; and associating by said computer system each of said sets of performance data with a particular one of said links.

2. The method of claim 1, wherein said storing comprises:

storing global positioning system ("GPS") coordinates associated with each of the sets of performance data;

and wherein said associating comprises:

associating each of said sets of performance data with said particular one of said links using said GPS coordinates.

3. The method of claim 2, wherein said GPS coordinates correspond to a position of a vehicle at one of a start and an end of a time interval during which said set of performance data was collected.

4. The method of claim 3, wherein said associating comprises:

determining which of said links said set of performance data corresponds to based on the relation between said GPS coordinates for said set of performance data and GPS coordinates for nodes that define said links.

5. The method of claim 1, wherein said storing comprises:
storing, on computer readable medium, distance information for each of said sets of performance data;
and wherein said associating comprises:
attributing by said computer system said sets of performance data to said links at least partially based on said distance information.

6. The method of claim 1, wherein said sets of performance data identify a vehicle type from which said performance data was collected.

7. The method of claim 1, wherein the route is divided into links based on one or more considerations, where such considerations comprise common portions, categorizations and junctures.

8. A method for storing performance data in a transit organization using a computer system, comprising:
storing, on a computer readable medium, sets of performance data for runs over a plurality of routes, said routes being divided into links, wherein said performance data permits analysis of drivers and vehicles; and
storing, on computer readable medium, associations between said sets of performance data and said links.

9. The method of claim 8, wherein said storing comprises:
storing, on computer readable medium, global positioning system ("GPS") coordinates associated with each of the sets of performance data;
and further comprising, prior to said storing associations:
determining by said computer system said associations using said GPS coordinates.

10. The method of claim 9, wherein said GPS coordinates correspond to a position of a vehicle at one of a start and an end of a time interval during which said set of performance data was collected.

11. The method of claim 10, wherein said determining comprises:
determining which of said links said set of performance data corresponds to based on the relation between said GPS coordinates for said set of performance data and GPS coordinates for nodes that define said links.

12. The method of claim 8, wherein said storing comprises:
storing distance information for each of said sets of performance data;
and further comprising, before said storing associations:
determining by a computer system said associations between said sets of performance data and said links at least partially based on said distance information.

13. The method of claim 8, wherein said sets of performance data identify a vehicle type from which said performance data was collected.

14. A method for storing performance data in a transit organization using a computer system, comprising:
registering by said computer system performance data for a plurality of runs over a plurality of routes divided into links, wherein said performance data permits analysis of drivers and vehicles; and
storing, on a computer readable medium, said performance data and associations between said performance data and said links.

15. A method for storing performance data in a transit organization using a computer system, comprising:
storing, on a computer readable medium, -a plurality of sets of performance data for runs over routes divided into links, wherein said performance data permits analysis of drivers and vehicles, said sets of performance data including an identifier identifying said links over which said sets of performance data were collected.

16. The method of claim 15, further comprising:
associating by said computer system said sets of performance data with said links.

17. A system for storing performance data in a transit organization on a computer readable medium, comprising:
a database on said computer readable medium storing a plurality of sets of performance data for runs over a plurality of routes, said routes being divided into links, wherein said performance data permits analysis of drivers and vehicles, and storing associations between said sets of performance data and said links.

18. The system of claim 17, wherein said sets of performance data include a vehicle type.

19. The system of claim 17, further comprising:
an association module determining said associations between said sets of performance data and said links.

20. The system of claim 19, wherein said sets of performance data include GPS coordinates, and wherein said association module determines said associations using said GPS coordinates.

21. The system of claim 20, wherein said association module compares said GPS coordinates for said sets of performance data to GPS coordinates for nodes that define said links to determine said associations.

22. A system for storing performance data in a transit organization on a computer readable medium, comprising:
a database on said computer readable medium storing a plurality of sets of performance data for runs over routes divided into links, wherein said performance data permits analysis of drivers and vehicles, said sets of performance data including an identifier identifying said links over which said sets of performance data were collected.

* * * * *